United States Patent Office 3,236,876
Patented Feb. 22, 1966

3,236,876
DIESTER COMPOUNDS
Irving S. Bengelsdorf, Tustin, and Harry Goldsmith, La Mirada, Calif., assignors to United States Borax & Chemical Corporation, Los Angeles, Calif., a corporation of Nevada
No Drawing. Filed May 27, 1963, Ser. No. 283,560
3 Claims. (Cl. 260—473)

This invention relates to mixed diester compounds, and more particularly it relates to novel diester compounds having both an isobutyryl and a chlorophenoxyacetyl moiety.

It is, therefore, an object of this invention to provide, as new compositions, certain mixed diester compounds having both an isobutyryl and a chlorophenoxyacetyl moiety.

Other objects will be apparent from the following disclosure.

To the accomplishment of the foregoing and related ends, said invention then comprises the features hereinafter fully described and particularly pointed out in the claims, the following description setting forth in detail certain illustrative embodiments of the invention, these being indicative, however, of but a few of the various ways in which the principle of the invention may be employed.

According to the present invention, there are provided compounds represented by the formula

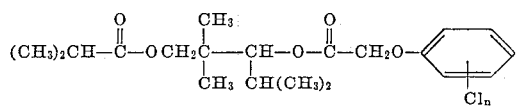

where $n$ is an integer of 1 to 3, inclusive. Typical examples of compounds represented by the above formula include 2,2,4-trimethyl-1-isobutyroxy-3-(4-chlorophenoxyacetoxy)pentane
2,2,4-trimethyl-1-isobutyroxy-3-(3-chlorophenoxyacetoxy)pentane
2,2,4-trimethyl-1-isobutyroxy-3-(2,4-dichlorophenoxyacetoxy)pentane
2,2,4-trimethyl-1-isobutyroxy-3-(2,5-dichlorophenoxyacetoxy)pentane
2,2,4-trimethyl-1-isobutyroxy-3-(2,4,5-trichlorophenoxyacetoxy)pentane
2,2,4-trimethyl-1-isobutyroxy-3-(2,4,6-trichlorophenoxyacetoxy)pentane The compounds are normally crystalline solids or viscous liquids which are soluble in the usual organic solvents such as alcohols, petroleum ether and benzene. They are useful as herbicides and can be formulated with the usual herbicidal carriers to provide herbicidal compositions.

The novel diesters of this invention are readily prepared by reaction of 2,2,4-trimethyl-3-hydroxypentyl isobutyrate with the corresponding chlorophenoxyacetyl chloride or bromide. Substantially equimolar amounts of reactants and an equivalent amount of a tertiary amine are preferred for best yields of the desired product. The tertiary amine, such as triethylamine or pyridine, neutralizes the by-product hydrogen halide as it is formed. The reaction takes place preferably at elevated temperatures, such as in the range of about 30° to 80° C., in a short time to give good yields of the desired product. An inert liquid reaction medium, such as benzene, is preferred for ease of handling the reactants and control of the reaction temperature. The product is isolated and purified by conventional procedures well known to those skilled in the art.

The intermediate compounds are well known to the art and are readily available.

The following examples illustrate the preparation of representative compounds of this invention, but it is to be understood that the invention is not to be limited to the specific examples given.

EXAMPLE I

*2,2,4-trimethyl-1-isobutyroxy-3-(2,4-dichlorophenoxyacetoxy)pentane*

To a stirred solution of 21.6 grams (0.1 mole) of 2,2,4-trimethyl-3-hydroxypentyl isobutyrate and 23.9 grams (0.1 mole) of 2,4-dichlorophenoxyacetyl chloride in 100 ml. of benzene was added 12 grams (0.12 mole) of triethylamine. The reaction mixture was allowed to warm to reflux temperature and was then stirred for one hour at ambient temperature. After filtering to remove the insoluble amine hydrochloride, the solvent was removed by distillation under reduced pressure. The residual crude product was distilled to give 18.2 grams (43%) of 2,2,4-trimethyl-1-isobutyroxy - 3 - (2,4 - dichlorophenoxyacetoxy)pentane, B.P. 182°–195° C. 0.27 mm. The distillate solidified to give a white, crystalline product, M.P. 76°–81° C. The infrared spectrum is consistent with the assigned structure.

EXAMPLE II

*2,2,4-trimethyl-1-isobutyroxy-3-(2,4,5 - trichlorophenoxyacetoxy)pentane*

Triethylamine (12 grams; 0.12 mole) was added to a stirred solution of 21.6 grams (0.1 mole) of 2,2,4-trimethyl-3-hydroxypentyl isobutyrate and 27.4 grams (0.1 mole) of 2,4,4-trichlorophenoxyacetyl chloride in 100 ml. of benzene. The reaction mixture was allowed to warm to reflux temperature and was then stirred for one hour at ambient temperature. The reaction mixture was filtered to remove the insoluble amine hydrochloride and the solvent was removed by distillation under reduced pressure to give 43.0 grams (95%) of crude 2,2,4-trimethyl-1-isobutyroxy-3-(2,4,5 - trichlorophenoxyacetoxy) pentane as a viscous brown liquid residue. A sample was dissolved in petroleum ether, filtered, and the filtrate evaporated to dryness to give a clear, amber-colored viscous liquid; $n_D^{24}$ 1.5340. The infrared spectrum was consistent with the assigned structure.

The diester compounds of this invention are effective herbicidal compounds, useful for controlling the growth of unwanted plants. The compounds are useful as a pre-emergence or post-emergence treatment; that is, they can be used to suppress the growth or kill growing plants, or they can be used to kill or prevent the emergence of seedlings of unwanted plants. They are especially useful for selectively controlling dicotyledonous species at low rates of application. Thus, at an application rate of about 0.15 to 1 pound per acre, excellent control of dicotyledonous species is obtained without injury to monocotyledonous species.

Since a small amount of the active compounds should be uniformly distributed over the area to be treated, the compounds preferably are formulated with conventional herbicide carriers, either liquid or solid, following procedures well known to those skilled in the herbicide art. Such formulations preferably include a surfactant to aid in dispersion, emulsification and coverage. Other herbicidal materials, such as the alkali metal borates and chlorates as well as other organic herbicides, can also be included in the formulations.

The following example illustrates the selective herbicidal activity of representative compounds of this invention when used as a post-emergence treatment at low application rates.

EXAMPLE III

Greenhouse flats were planted to corn, oats, ryegrass, millet, mustard, peas, cucumbers and snapbeans. The growing medium was vermiculite, to which one liter of a complete nutrient solution (Hoagland's solution) was added at planting and at 10 day intervals thereafter. Nine days after planting, the plants were sprayed with a methanol solution of the compound to be tested at various rates ranging from 0.13 to 0.76 pound of the active compound per acre and spray volume of 124 gallons per acre. Thirty days after treatment, the plants were examined and the herbicidal activity recorded as in Table A. The plants were rated on a 0 to 10 basis, with 0 meaning no effect, and 10 meaning 100% kill of plants.

Other modes of applying the principle of the invention may be employed, change being made as regards the details described, provided the features stated in any of the following claims or the equivalent of such be employed.

We, therefore, particularly point out and distinctly claim as our invention:

1. A compound of the formula

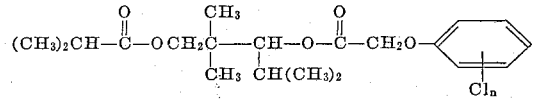

wherein $n$ is an integer of 1 to 3, inclusive.

2. 2,2,4-trimethyl-1-isobutyroxy-3-(2,4 - dichlorophenoxyacetoxy)pentane.

3. 2,2,4-trimethyl-1-isobutyroxy - 3 - (2,4,5 - trichlorophenoxyacetoxy)pentane.

TABLE A

| Compound | Appln. Rate (lb./A.) | Herbicidal Effect on— | | | | | | | |
|---|---|---|---|---|---|---|---|---|---|
| | | Corn | Oats | Ryegrass | Millet | Mustard | Peas | Cucumber | Beans |
| 2,2,4-trimethyl-1-isobutyroxy-3-(2,4-dichlorophenoxyacetoxy)pentane | 0.14 | 0 | 0 | 0 | 0 | 10 | 9 | 6 | 6 |
| | 0.28 | 0 | 0 | 0 | 0 | 10 | 10 | 6 | 7 |
| | 0.47 | 0 | 0 | 0 | 0 | 10 | 10 | 7 | 10 |
| | 0.76 | 0 | 0 | 0 | 0 | 10 | 10 | 9 | 10 |
| 2,2,4-trimethyl-1-isobutyroxy-3-(2,4,5-trichlorophenoxyacetoxy)pentane | 0.13 | 0 | 0 | 0 | 0 | 9 | 7 | 10 | 9 |
| | 0.27 | 0 | 0 | 0 | 0 | 10 | 10 | 10 | 10 |
| | 0.44 | 0 | 0 | 0 | 0 | 9 | 10 | 10 | 10 |
| | 0.71 | 0 | 0 | 0 | 0 | 9 | 10 | 10 | 10 |

Thus, the example clearly demonstrates the highly selective herbicidal activity of the compounds at low application rates. The dicotyledonous species were effectively controlled while there was no effect on the monocotyledonous species. Comparable results were obtained when the compounds were used as a pre-emergence treatment.

References Cited by the Examiner

UNITED STATES PATENTS 2,765,224  10/1956  Lambrech _____ 260—473
2,818,424  12/1957  Zeile et al. _____ 260—473

LORRAINE A. WEINBERGER, *Primary Examiner.*